United States Patent Office 3,284,290
Patented Nov. 8, 1966

3,284,290
TIN DIBUTYL DISALICYLATE FUNGICIDE
Dorsey R. Mussell, Clare, Mich., assignor to The Dow Chemical Company, Midland, Mich., a corporation of Delaware
No Drawing. Filed May 1, 1963, Ser. No. 277,121
3 Claims. (Cl. 167—30)

The present invention is concerned with the control of pathogenic fungi parasitic upon economic plants, and is particularly concerned with methods for the control of plant-pathogenic fungi that employ the compound tin dibutyl disalicylate. The expression "control" is used herein in its most conventional sense as it is employed by plant pathologists: to mean prevention, destruction, inhibition and limitation, of incidence, growth, spread, and reproduction.

Since the discovery of Bordeaux mixture by Millardet, in France, and its introduction to the control of downy mildew of grapes in 1883–1885, research workers and agricultural producers have desired a substance highly selective in its action against plant pathogenic fungi but so harmless to the host plant as to cause little or no injury. As in the case of Bordeaux mixture, most of the fungicides hitherto known have had the disadvantage of being injurious to plants when applied at rates which effectively protect the plants from the attack of fungus spores. Moreover, various substances used as plant fungicides have other disadvantages such as dark color, insolubility whereby screens and spray orifices are sometimes plugged, and the like.

Consequently, it is an object of the present invention to provide an improved method for the protection of plants from the attacks of plant-pathogenic fungi.

According to the present invention, a chlorophyll-bearing plant is protected from the attack of pathogenic fungi without harm to the said plant by spraying the plant with an aqueous dispersion of tin dibutyl disalicylate. This compound has the formula

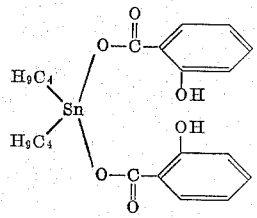

The compound is a crystalline solid, white in mass.

Under practical conditions it is impossible to specify with great precision the amount of fungicidal agent to be employed, because much depends upon such factors as what kind of plant is to be protected and whether it has glabrous or villous surfaces, whether the application is made in damp or dry weather, and the like.

In general, good results are obtained according to the present invention when a dispersion of tin dibutyl disalicylate is prepared in a concentration of from 10 to 1,000 parts per million and the said dispersion is applied as a thorough, wetting spray to all above-ground parts of the plants in a relative amount sufficient that, as further amounts are applied, such further amounts of the said dispersion run off from the surfaces of the said plants. This is known as "run-off" and is widely accepted in the treatment of plants as a definite and essentially replicable end-point of an application rate. In the case of plants having waxy tops such as onions, run-off is achieved at relatively low application rates; in the case of plants having essentially villous vegetative parts, such as the tomato, application to run off requires a considerably higher application rate.

Irrespective of the rate, assuming good coverage of the plant, as liquid media are evaporated spontaneously away, the concentration of tin dibutyl disalicylate increases until it becomes, ultimately, theoretically essentially a deposit of the pure compound on the surface of the plant vegetative parts. However, the process is effective whether the invading spores of a plant pathogenic fungus come in contact with a leaf upon the surface of which the dispersion has dried, or in contact with the aqueous dispersion itself on a leaf surface.

In carrying out the process of the present invention, after the correct choice of fungicide as indicated, the procedural steps are essentially conventional. The said tin dibutyl disalicylate is dispersed in water without or preferably with the aid of a co-solvent which can be acetone, xylene, toluene, alcohol, and various other well-known co-solvent liquids. The dispersion is facilitated by the preferable employment, together with the plant protectant compound and co-solvent if employed, of wetting or dispersing surfactant adjuvants. Not only do these effect a good dispersion of the tin dibutyl disalicylate in the aqueous preparation but also they effect its satisfactory spreading over plant surfaces.

If desired, the tin dibutyl disalicylate fungicidal toxicant according to the present invention can be applied as a dust. In such case, the substance is dispersed in and on an inert finely divided solid carrier such as a finely divided clay, infusorial earth, wood flour, or other known inert finely divided solid fungicidal carrier adjuvant substance.

In such process, there can be added to the said finely divided solid a sticking agent, or, if desired, wetting agents whereby the same preparation can be employed as either a dust or as a wettable powder. While the dust or wettable powder preparation is effective and is used with good results, an aqueous dispersion without inert finely divided solid is more preferred.

The tin dibutyl disalicylate preparation according to the present invention is toxic in a useful way to objectionable microorganisms of a considerable spectrum. For example, good results are obtained when using the present process to protect plants against such ascomycetous pathogens as the Erysiphaceae, represented by the powdery mildew Erysiphe of cucumber. Also, good results are obtained when the present process is employed to protect plants against representative pathogens of the Oömycetes as represented in the Pythiaceae, of which one genus is Phytophthora, a serious pathogen of the Solanaceae. Thus, not only is the present process effective against fungi of a wide range, but it favors, with great selectivity, economic chlorophyll-bearing plants of a wide biological range.

In a procedure representative of the best method now known to the inventor, tin dibutyl disalicylate is dissolved in acetone, a small, non-critical quantity of surfactant is added thereto, and the resulting solution is dispersed in water to obtain an aqueous preparation containing tin dibutyl disalicylate as sole toxicant in a concentration optionally chosen between fifty and one-hundred fifty parts of tin dibutyl disalicylate per million parts of resulting aqueous dispersion, all parts by weight. This preparation is then sprayed upon plants which it is desired to protect from pathogenic fungi. The spray is applied until the application of further spray results only in the run-off, from the plants, of the applied further portions of spray. Thereafter, the plants are essentially immune to fungal attack until such time, as through further growth, parts newly proliferated beyond the applied tin compound spray and therefore not protected by it may be susceptible of attack. Depending upon the rate of growth, such new growth should be further sprayed in the indicated manner if the danger of fungus attack continues.

In a representative operation, an aqueous dispersion of tin dibutyl disalicylate prepared in the indicated manner was applied as a spray to the point of run-off to young, healthy tomato plants. The tomato plants were then permitted to become air-dry by evaporation from their surfaces of fluid present in the tin dibutyl disalicylate aqueous dispersion. The resulting plants were then heavily sprayed with viable spores of *Phytophthora infestans* and placed under conditions of humidity, temperature, and illumination ideal for the proliferation of the fungus at the expense of the tomato plants.

A similar group of tomato plants was treated similarly in all respects except that the aqueous preparation contained no tin dibutyl disalicylate, containing, in fact, no toxicant but being used solely as a check. All plants were thereafter regularly examined during a period of three weeks, and their condition noted. At the end of this time, all check plants were heavily infested with the said fungus, and either dead or in moribund condition. In contrast, all the plants that had been treated with the tin dibutyl disalicylate dispersion were essentially free from loci of attack by the said fungus. Control was rated by an expert plant pathologist at between 98 and 100 percent.

Similarly, well-developed cucumber plants treated in the manner of the present invention and thereafter exposed to heavy challenge by viable spores of powdery mildew of cucumbers manifest almost complete protection from the powdery mildew. In contrast, a check group of cucumber plants similarly treated except that the dibutyl tin disalicylate toxicant of the present invention is omitted from the treating dispersion become heavily infected and moribund within a few days.

Also, an aqueous dispersion comprising the toxicant of the present invention as sole fungicidal agent in the concentration of one thousand parts of toxicant per million parts of aqueous dispersion, all by weight, is employed as a late dormant season spray of peach trees for control of peach leaf curl. Good control is achieved.

In generally similar manner, the application of the present process to plants and plant parts susceptible of fungal infection prior to such infection usually consistently renders such plants and plant parts highly resistant to fungal attack. For the achievement of uniformally good results, it is preferred to achieve uniform pre-infection surface covering of the plant parts susceptible of fungal invasion and to be protected.

Tin dibutyl disalicylate (also called dibutyltin disalicylate) to be employed as a toxicant in the present process is a known compound. It is readily prepared in conventional synthesis. One such is carried out by causing a reaction between one mole of dibutyltin dichloride and two moles of the alkali metal salt of salicylic acid. The reaction is easily caused by combining the dibutyltin dichloride and alkali metal salicylate in an inert liquid reaction medium which can be, for example, tetrahydrofuran. The reaction proceeds very slowly at room temperature but goes to completion without undue delay when heated with active stirring at a reaction temperature between 50 and 150 degrees centigrade.

I claim:

1. The process for the control of plant-pathogenic fungi that comprises the step of applying to a plant part susceptible of fungus attack a fungus-controlling amount of tin dibutyl disalicylate.

2. The process of claim 1 wherein the tin dibutyl disalicylate is applied as an aqueous dispersion.

3. A fungicidal composition of which the active component is tin dibutyl disalicylate together with an inert, finely divided solid carrier.

References Cited by the Examiner

UNITED STATES PATENTS

| | | | |
|---|---|---|---|
| 2,445,739 | 7/1948 | Rowland et al. | 28—82 |
| 2,957,785 | 10/1960 | Leatherland | 260—429.7 X |
| 2,977,379 | 3/1961 | Dorfelt et al. | 260—429.7 |

FOREIGN PATENTS

| | | |
|---|---|---|
| 797,073 | 6/1958 | Great Britain. |

JULIAN S. LEVITT, *Primary Examiner.*

LEWIS GOTTS, *Examiner.*

D. L. MOYER, G. A. MENTIS, *Assistant Examiners.*